United States Patent
Tryon et al.

(10) Patent No.: US 9,780,474 B2
(45) Date of Patent: Oct. 3, 2017

(54) HIDDEN ELECTRICAL CONTACTS

(71) Applicant: Apple Inc., Cupertino, CA (US)

(72) Inventors: Brian S. Tryon, Los Gatos, CA (US); Alexander W. Williams, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/069,125

(22) Filed: Mar. 14, 2016

(65) Prior Publication Data

US 2017/0093070 A1 Mar. 30, 2017

Related U.S. Application Data

(60) Provisional application No. 62/235,513, filed on Sep. 30, 2015.

(51) Int. Cl.
*H01R 25/00* (2006.01)
*H01R 13/22* (2006.01)
*H01R 13/03* (2006.01)

(52) U.S. Cl.
CPC ............. *H01R 13/22* (2013.01); *H01R 13/03* (2013.01)

(58) Field of Classification Search
CPC ......... H01R 13/22; H01R 13/02; H01R 13/03
USPC .................................................. 439/289, 886
See application file for complete search history.

(56) References Cited

U.S. PATENT DOCUMENTS

| | | | | |
|---|---|---|---|---|
| 5,049,085 A | * | 9/1991 | Reylek | H01R 43/00 439/591 |
| 5,782,645 A | * | 7/1998 | Stobie | A61N 1/02 439/289 |
| 6,000,977 A | * | 12/1999 | Haake | H01R 13/02 439/567 |
| 6,438,829 B1 | * | 8/2002 | Haake | H01R 13/02 174/261 |

* cited by examiner

*Primary Examiner* — Khiem Nguyen
(74) *Attorney, Agent, or Firm* — Kilpatrick Townsend & Stockton LLP

(57) ABSTRACT

Electrical contacts are described. An electrical contact can be formed on an exterior surface of a housing of an electronic device and can be cosmetically similar to the exterior surface. For example, the electrical contact can include a conductive plug inserted through an opening in a wall of the housing. A metallic coating can be applied to an outward-facing end of the conductive plug and fill up an outer portion of the opening until the metallic coating is about flush with the exterior surface of the housing. Properties of the metallic coating can be selected to closely match a color and a texture of the housing.

16 Claims, 5 Drawing Sheets

HIDDEN ELECTRICAL CONTACTS

CROSS-REFERENCE TO RELATED APPLICATION(S)

The present application claims the benefit of priority of U.S. Provisional Application No. 62/235,513 entitled "Hidden Electrical Contacts," filed on Sep. 30, 2015, the entire contents of which is hereby incorporated by reference.

FIELD

This disclosure relates to electrical contacts, in particular, electrical contacts that are used in connection with electronic devices.

BACKGROUND

Electronic devices (e.g., laptops, mobile devices, tablets) can interface with accessory devices, such as a keyboard, that can provide input to the electronic device or otherwise augment its functionality. While many different types of accessory devices can wirelessly connect to an electronic device, some accessory devices can consume less power and communicate more quickly and more accurately when physically connected to an electronic device using a connector that includes one or more electrical contacts. For such a physical connection to work, the electronic device can include one or more electrical contacts positioned at an exterior surface of the electronic device. Locating electrical contacts or a connector structure with electrical contacts at an exterior surface, however, represents a break in the housing of the electronic device and provides a contrast to the continuous housing in both color and texture. Such a break in color and texture can reduce aesthetic appeal.

SUMMARY

Examples of the present disclosure are directed to electrical contacts that can be exposed at but hidden along an exterior surface of a housing or other portion of an electronic device. In some examples, outward-facing portions of the contacts are designed to match color and texture of the housing. In this manner, the contacts can be cosmetically similar to the housing making the contacts difficult to discern, or when the color and texture of the housing is precisely matched, completely hidden to an unaided eye. The hidden contacts according to embodiments of the disclosure can be used to electrically connect an accessory to the electronic device.

In some examples, an electronic device can include a housing having one or more openings that extend through a wall of the housing. Each opening can represent a contact location and can have a circular or non-circular recessed portion along an exterior surface of the wall. Within each opening can be formed a conductive plug. Within the recessed portion can be placed a conductive material that electrically couples with the conductive plug. The conductive material can extend within the recessed portion of the wall and smoothly transition to the exterior surface. The conductive material can be selected to have a color and texture that correspond closely to the color and texture of the housing. In this manner, an outward-facing portion of the contact can be hidden in the housing.

In some examples, an electronic device can include a housing having one or more openings that extend through a wall of the housing. Each opening can represent a contact location and can include a plug of insulative material formed to correspond in size to the opening. The plug can include a plurality of pores that extend throughout the plug. The plurality of pores can be filled with conductive material to create conductive pathways from one end of the plug to the other. In some examples, each pore has a diameter less than 0.5 millimeter and in some examples, the diameters are less than 50 microns. The plug, now conductive, can be placed in the opening. The insulative material and the conductive material can be selected to have colors and textures that correspond closely to the colors and textures of the housing. In this manner, an outward-facing portion of the contact can be hidden in the housing.

In some examples, an electronic device can include a housing having one or more contact locations each including an electrical contact that includes a plurality of hole clusters. Each hole cluster can be made up of a plurality of micro holes that each extend through a wall of the housing. In some examples, each micro hole has a diameter less than 0.5 millimeter and in some examples, the diameters are less than 50 microns. After the micro holes are formed in the wall, the micro holes can be filled with conductive material to create conductive pathways from one side of the wall to the other side of the wall. The conductive pathways can be electrically coupled together using a contact plate on an interior side of the housing. The conductive material can be selected to have a color and texture that correspond closely to the color and texture of the housing. In this manner, an outward-facing portion of the contact can be hidden in the housing.

In some examples, an electronic device can include a housing having one or more pluralities of holes that extend through a wall of the housing. Each plurality of holes can represent a contact location along an exterior portion of the housing. Within each hole in each of the plurality of holes, can be inserted a conductive plug made up of a plurality of conductive fibers held by an insulative material. In some examples, each conductive fiber has a diameter less than 0.5 millimeter and in some examples, the diameters are less than 50 microns. The conductive plugs for each contact location, i.e., each contact, can be electrically coupled using a contact plate on an interior portion of the housing. The insulative material and the conductive material can be selected to have colors and textures that correspond closely to the color and texture of the housing. In this manner, an outward-facing portion of the contact can be hidden in the housing.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

The disclosure will be readily understood by the following detailed description in conjunction with the accompanying drawings, in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1A:
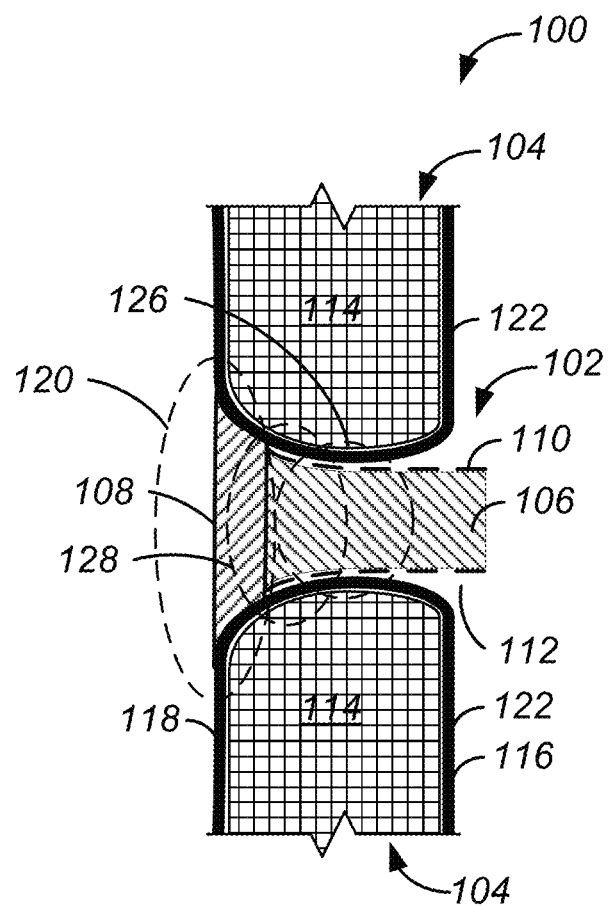
FIG. 1A shows a profile view of an electrical contact in connection with a housing, in accordance with at least one example.

FIG. 1A illustrates a portion of an electronic device 100 that includes an electrical contact 102 held within a housing 104 of the electronic device 100. The electronic device 100 (and any other electronic device described herein) can be any suitable electronic device including, for example, a mobile phone, a tablet, a laptop, a personal computer, a wearable device, a media player device, and any other suitable electronic device, each of which may also be considered a personal electronic device or user device. In some examples, the electrical contact 102 (and any other electrical contact described herein) can be included in other devices such as, for example, televisions, cable boxes, automobiles (e.g., for connecting diagnostic devices or connecting media players or mobile phones), modems, hard drives, routers, and any other suitable devices by which data signals and/or power signals can be transferred. In some examples, the electrical contact 102 can function to electrically connect an accessory or other equipment to the electronic device 100. As described in more detail herein, the electrical contact 102 (or any other electrical contact described herein) can be designed and constructed to be cosmetically similar to the housing 104 (or any other housing described herein). In some examples, an electrical contact is cosmetically similar to a housing when the location of the electrical contact is difficult to discern, or when the color and texture of the housing is precisely matched, making the electrical contact completely hidden to an unaided eye. In some examples, an electrical contact is cosmetically similar to a housing when an average human is unable to perceive, whether by viewing or through touch, that an electrical contact is included within the housing. For example, with reference to FIG. 1A, the colors of an outward portion of the electrical contact 102 and the housing 104 can be closely matched such that there is little to no color variation between the two. In some examples, the texture of the electrical contact 102 can also be closely matched to the texture of the housing 104. In addition, the exterior surface of the electrical contact 102 can be slightly proud, slightly recessed, or flush with respect to the exterior surface of housing 104 that surrounds contact 102 such that the electrical contact 102 is seamlessly mounted in the housing 104. For example, the contact 102 can extend beyond the exterior surface of the housing 104 by 1-25 microns, can be recessed below the exterior surface of the housing 104 by 1-25 microns, or can be positioned so as to have a height difference with respect the exterior surface of the housing 104 that is less than 1 micron. In some examples, the ranges for what constitutes slightly proud and slightly recessed can be greater than 25 microns (e.g., 50 microns) or less than 1 micron (e.g., 0.1 micron).

In order to achieve cosmetic similarity while also conducting electricity, the electrical contact 102 can include a conductive plug 106 in contact with a metallic coating 108. The conductive plug 106 and the metallic coating 108 can each be considered a conductive element. The conductive plug 106 can be formed from any suitable conductive material including, for example, copper, or copper alloy. In some examples, the electrical contact 102 includes an insulative sleeve 110 that surrounds an exterior surface of the conductive plug 106 along the depth of the conductive plug. In other examples, the insulative sleeve 110 is not a part of the electrical contact 102. The insulative sleeve 110 can be formed from any suitable insulative material, which, in some examples, can be pliable to help retain the conductive plug 106 within the housing 104. The insulative sleeve 110 can function as an insulative barrier between the electrical contact 102 and the housing 104.

The electrical contact 102 is shown inserted into an opening 112 in a wall 114 of the housing 104. In some examples, the opening 112 can be included in an array of openings, with each opening including its own electrical contact. The opening 112 can be a circular opening, which can correspond to a circular cross-section of the conductive plug 106. In some examples, the opening 112 has a non-circular cross-section, which can correspond to a non-circular cross-section of the conductive plug 106. The opening 112 extends between an interior surface 116 of the housing 104 and an exterior surface 118 of the housing 104. The interior surface 116 can face the inside of the housing 104 and the exterior surface 118 can face outside of the housing 104. While the wall 114 is illustrated as being in a straight portion of the housing 104, it is understood that the electrical contact 102 can also be formed in an opening that is placed in the wall 114 along a curved section of the housing 104.

The opening 112 can be formed in a contact region of the housing 104. The contact region can be a region on the housing 104 in which forming the electrical contact 102 can be achieved. In some examples, the exterior surface 118 that corresponds to the contact region can have a color and a texture. A color and a texture of the metallic coating 108 can be selected to match the color and the texture of the contact region and/or the housing 104 generally. In some examples, the housing 104 can have more than one contact region.

The opening 112 can extend from the exterior surface 118 within the contact region to the interior surface 116. In some examples, the opening 112 can include an outer portion 120, an inner portion 126, and a transition portion 128 disposed between the outer portion 120 and the inner portion 126. The outer portion 120 can extend from a first end of the conductive plug 106 that is recessed from the exterior surface 118 to the exterior surface 118. The inner portion 126 can extend from the outer portion 120 towards the interior surface 116.

In some examples, a cross-section of the inner portion 126 can be uniform such that the inner portion 126 resembles a shaft. In some examples, the cross-section of the outer portion 120 can have a similar cross-section that also resembles a shaft, which can be of the same size as the inner portion 126 or larger. In some examples, the outer portion 120 and the inner portion 126 each have circular cross-sections, with the outer portion 120 having a circular cross-section at the exterior surface 118 that is larger than a circular cross-section of the inner portion 126 of the opening 112. In some examples, the transition portion 128 can have a circular cross-section that gradually increases as it moves axially from the inner portion 126 to the outer portion 120. In other examples, the cross-sections of the inner portion 126, the outer portion 120, and/or the transition portion 128 are non-circular. For example, a square cross-section of the outer portion 120 of the opening 112 at the exterior surface 118 can be larger than a square cross-section of the inner portion 126 of the opening 112.

In some examples, the transition portion 128 can overlap with the outer portion 120 and/or the inner portion 126. In some examples, the transition portion 128 can include any suitable transition in shape or cross-section between the outer portion 120 and the inner portion 126. For example, the transition portion 128 can form a tapered transition that extends from the inner portion 126 to the outer portion 120. In this example, a cross-section of the transition portion 128 can uniformly increase as it moves away from the conductive plug 106 towards the exterior surface 118 until it intersects with the exterior surface 118. The transition portion 128 can also form a curved contoured transition that extends from the inner portion 126 to the outer portion 120. In this example, a cross-section of the transition portion 128 can increase at a variable rate as it moves away from the conductive plug 106 towards the exterior surface 118. For example, interior walls of the opening 112 in the curved contoured example can decrease in slope as they move from the conductive plug 106 towards the exterior surface 118. In this manner, the opening 112 gradually opens larger moving from the inner portion 126 to the exterior surface 118. The transition portion 128 can also form a stepped transition that extends from the inner portion 126 to the outer portion 120. In this example, a change between a cross-section of the inner portion 126 and a cross-section of the outer portion 120 can correspond to a step. In some examples, the transition portion 128 can include more than one steps. The transition portion 128 can also include any suitable combination of the examples described herein. In some examples, a cross-section of the opening 112 (e.g., a diameter of the opening when the opening 112 is round) can decrease between the outer portion 120 and the inner portion 126. This decrease of the cross-section of the opening 112 can take place in the transition portion 128.

In some examples, after the opening 112 has been formed in the wall 114, the housing 104 can be anodized to create anodization layer 122. As the housing 104 can be formed from aluminum, in some examples, the anodization layer 122 can extend across the entirety of the housing 104, including within the opening 112. In some examples, the anodization layer 122 can function as an insulative layer between the conductive plug 106 and the wall 114, and between the metallic coating 108 and the wall 114. The conductive plug 106 can be held in the wall 114 via threads, an anti-rotation pin (not shown) embedded in the wall 114, or in any other suitable manner.

The outer portion 120 can be included in the wall 114 to provide an area where the metallic coating 108 can be applied. As illustrated in FIG. 1A, a portion of the metallic coating 108 can be in physical contact with the conductive plug 106 to form the electrical contact 102. A portion of the metallic coating 108 can also be in physical contact with the exterior surface 118 of the wall 114. Because of the anodization layer 122, however, the metallic coating 108 can be insulated from the exterior surface 118. In some examples, the electrical conductivity of the electrical contact 102 can be greater than the electrical conductivity of at least a portion of the housing 104 surrounding the electrical contact 102. For example, in the absence of the anodization layer 122 or at least a strong anodization layer 122, the electrical contact 102 may nevertheless conduct electricity at least in part because it has a higher electrical conductivity value as compared to a portion of the wall 114 surrounding the electrical contact 102. In some examples, when the housing 104 is formed from a non-metallic material (e.g., a ceramic material), the electrical conductivity of the electrical contact 102 can be greater than the portion of the housing 104 surrounding the electrical contact 102.

The metallic coating 108 can define an exterior surface of the electrical contact 102. The metallic coating 108 can therefore be disposed within the outer portion 120 and fill the outer portion 120 covering the first end of the conductive plug 106. The metallic coating 108 can be any suitable conductive material that can be sprayed, deposited, or otherwise applied within the outer portion 120. Such materials can include, for example, gold, titanium nitride, titanium carbon nitride, and other such materials. In some examples, the type of material can be selected that has conductive properties and also has similar color and texture properties as the exterior surface 118. For example, when the exterior surface 118 is gold colored, gold or a gold alloy can be selected as the metallic coating 108. In this manner, the colors between the metallic coating 108 and the exterior surface 118 can be cosmetically similar.

Figure 1B:
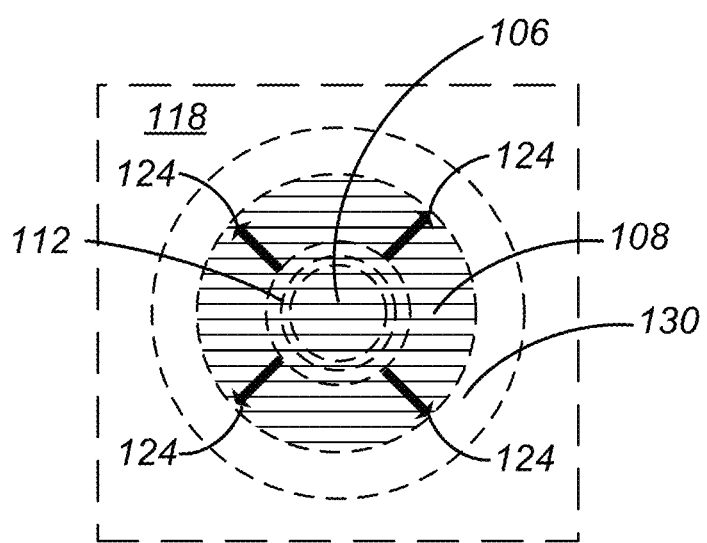
FIG. 1B shows a frontal view of the electrical contact and the housing from FIG. 1A, in accordance with at least one example.

FIG. 1B illustrates a frontal view of the exterior surface 118 of the wall 114. In the view illustrated in FIG. 1B, the conductive plug 106 is shown behind the metallic coating 108. The metallic coating 108 can extend radially in the direction of arrows 124 from within the outer portion 120 towards a flat portion 130 of the exterior surface 118 that surrounds the opening 112. The thickness of the metallic coating 108 can decrease as it extends in the direction of the arrows 124 towards the flat portion 130 of the exterior surface 118. In this manner, the metallic coating 108 can be "feathered out" (i.e., become thinner and thinner) within the flat portion 130 and beyond in order to make a smooth and cosmetically imperceptible transition to the exterior surface 118. In this manner, the metallic coating 108 and a portion of the exterior surface 118 surrounding the metallic coating 108 can together form a continuous cosmetic surface. Texture, color, and/or other cosmetic characteristics (e.g., reflectivity, hue, shade, tint, value, iridescence, etc.) can be cosmetically similar within the continuous cosmetic surface; and, thus, cosmetically imperceptible. In some examples, some degree of perceptibility is tolerated other than total imperceptibility. In some examples, a masking is used to control the extents of the metallic coating 108 with respect to the exterior surface 118. In some examples, the metallic coating 108 can be slightly proud (e.g., extending beyond the exterior surface 118 by 1-25 microns), slightly recessed (e.g., recessed below the exterior surface 118 by 1-25 microns), or flush with the exterior surface 118 (e.g., difference between the metallic coating 108 and the exterior surface of less than 1 micron).

Figure 2A:
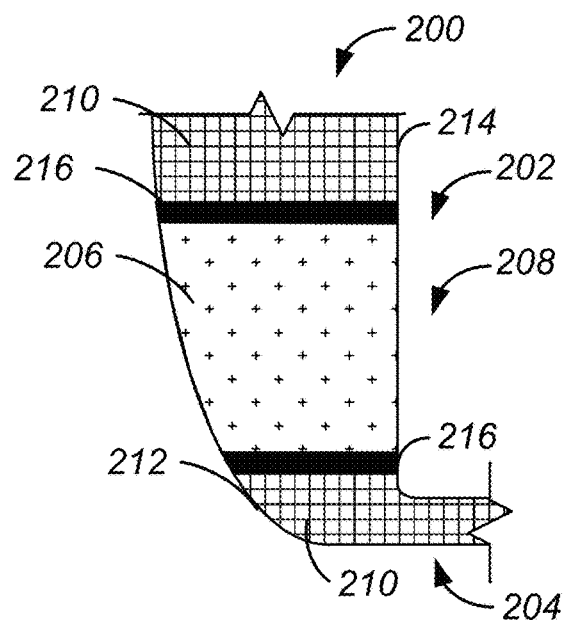
FIG. 2A shows a profile view of an electrical contact in connection with a housing, in accordance with at least one example.

FIG. 2A illustrates a portion of an electronic device 200 that includes an electrical contact 202 according to some embodiments of the disclosure. As shown in FIG. 2A, electrical contact 202 is held within a housing 204 of the electronic device 200. Like the electrical contact 102, the electrical contact 202 can function as an electrical contact when an accessory or other equipment is connected to the electronic device 200.

To this end, the electrical contact 202 can include a plug 206 that extends through an opening 208 within a wall 210 of the housing 204. In some examples, the opening 208 can be included in an array of openings, with each opening including its own electrical contact. The opening 208 extends from an interior surface 214 of the housing 204 to an exterior surface 212 of the housing 204. The plug 206 can be formed as a puck having a shape that corresponds to the shape of the exterior surface 212 and the interior surface 214. In some examples, the plug 206 has a columnar shape that corresponds to the opening 208. The plug 206 can be formed from any suitable insulative material having an open-cell porous composition or capable of having a plurality of pores placed therein. For example, the insulative material can be ceramic. As discussed with reference to FIGS. 2B-2D, the plug 206 can be processed in order to fill the pores, whether naturally occurring or created, of the plug 206 with conductive material. The plug 206 can then be placed within the opening 208 to create the electrical contact 202. In some examples, the electrical contact 202 also includes an insulator 216. The insulator 216 can function to insulate the plug 206 from the wall 210 which may be conductive. In some examples, the plug 206 can be placed in the opening 208 after the housing 204 has been anodized. The opening 208 can have a circular cross-section or any other non-circular cross-section.

Figure 2B:
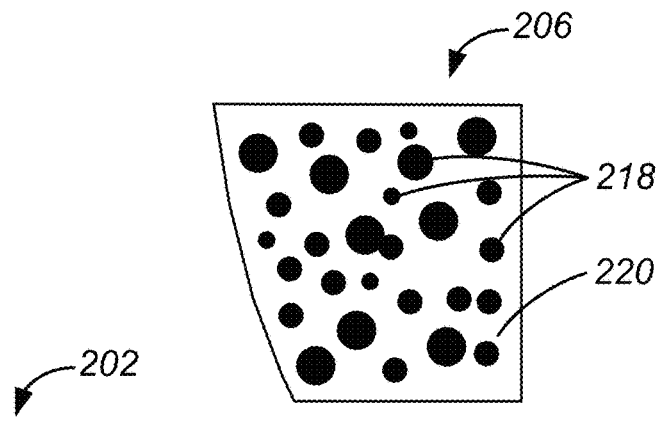
FIG. 2B shows a detailed view of the electrical contact from FIG. 2A, in accordance with at least one example.

FIG. 2B illustrates the plug 206 having an example porous composition. The porous composition can include a plurality of pores 218 disposed within an insulative material 220. At least a portion of the plurality of pores 218 may be connected to each other in order to form a continuum of cavity space. While the pores 218 are drawn for illustrative purposes as being visible, it is understood that the pores 218 can be much smaller in size and shape. For example, the diameter of the pores 218 can be less than 0.5 millimeter and in some examples, the diameters are less than 50 microns. The pores 218 can be considered amorphous because their structure and size are varied with respect to each other. In some examples, the pores 218 can be considered uniform because their structure and size correspond to a pattern of pores. In some examples, the pores 218 naturally occur within the insulative material 220. In other words, the pores 218 can be present based on properties of the insulative material 220 selected to create the plug 206 illustrated in FIG. 2B. In some examples, the insulative material 220 is processed in some manner to cause the pores 218 to appear. For example, the insulative material 220 can be heated and cooled in a manner that causes the pores 218 to appear. In some examples, the pores 218 pass through the insulative material 220 in all directions. In this manner the insulative material 220 can be compared to an open-cell sponge, with the pores 218 being the openings in the sponge or the cell-like structure within the sponge.

For the plug 206 to become conductive, the pores 218 can be filled with conductive material. For example, a conductive metal can be heated and forced into the pores 218. Depending on the properties of the conductive material and the size of the pores 218, filling the pores 218 can include filling the pores 218 using vacuum suction, high pressure, and/or high heat. In this manner, the conductive material can extend throughout the pores 218 from end to end and side to side of the plug 206. In some examples, filling the pores 218 with the conductive material can create conductive pathways through the plug 206 that extend from the exterior surface 212 to the interior surface 214. The conductive pathways can be considered conductive elements.

In some examples, the plug 206 is formed such that an amount of visible conductive material within the pores 218 compared to visible insulative material 220 falls within some threshold. Values that fall below the threshold can be said to be visually imperceptible, while values that exceed the threshold can be said to be more visually perceptible. In this manner, the plug 206 can be formed such that when inserted into the opening 208 becomes visually imperceptible.

The conductive material and the insulative material 220 can be selected to have colors and textures that can be matched to a color and a texture of the exterior surface 212. In some examples, when the size of the pores 218 when filled with the conductive material are imperceptible by the naked eye, just the insulative material 220 can be matched to the exterior surface 212.

Figure 2C:
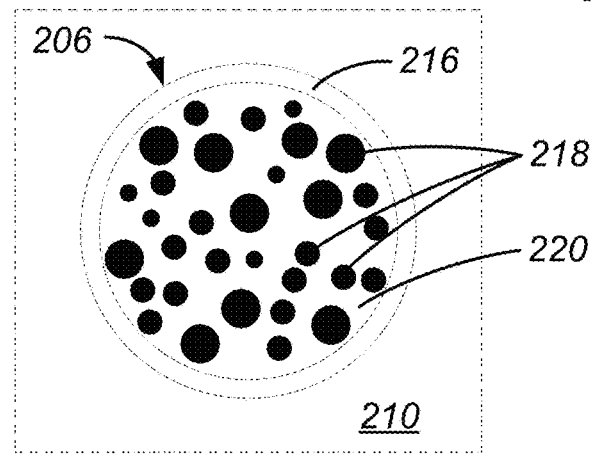
FIG. 2C shows a frontal view of the electrical contact and the housing from FIG. 2A, in accordance with at least one example.

FIG. 2C illustrates a frontal view of the exterior surface 212 of the wall 210 after the plug 206 has been installed in the opening 208. In the view illustrated in FIG. 2C, a frontal face of the electrical contact 202 is shown along with the insulator 216. Additionally, in FIG. 2C, the pores 218 are illustrated within the insulative material 220. In some examples, after the plug 206 has been placed in the opening 208 of the wall 210, the frontal face of the electrical contact 202 can be processed to create a smooth transition between the electrical contact 202 and the exterior surface 212. Such processing can include machining, sand blasting, or any other suitable process. In some examples, before or after processing, the plug 206 and a portion of the wall 210 surrounding the plug 206 can together form a continuous cosmetic surface. Texture, color, and/or other cosmetic characteristics (e.g., reflectivity, hue, shade, tint, value, iridescence, etc.) can be cosmetically similar within the continuous cosmetic surface; and, thus, cosmetically imperceptible. In some examples, some degree of perceptibility is tolerated other than total imperceptibility.

Figure 2D:
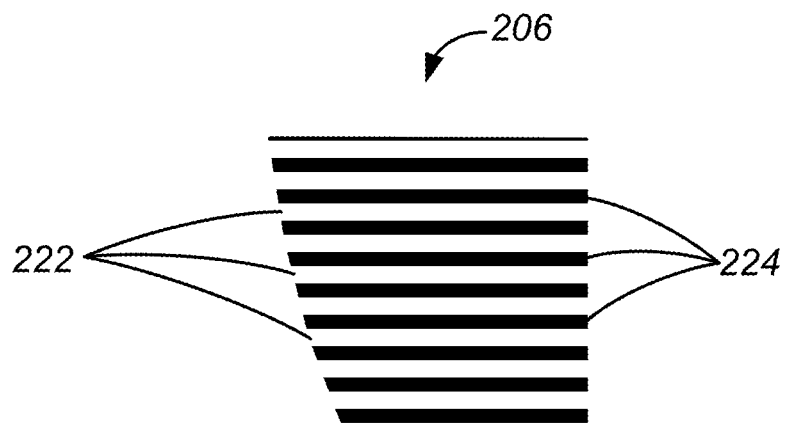
FIG. 2D shows a detailed view of the electrical contact from FIG. 2A, in accordance with at least one example.

FIG. 2D illustrates the plug 206 having an example porous composition. The porous composition in FIG. 2D can include a plurality of columnar pores 222 disposed within an insulative material 224. While the columnar pores 222 are drawn for illustrative purposes as being visible, it is understood that the columnar pores 222 can be much smaller in diameter. For example, the diameter of the columnar pores 222 can be less than 0.5 millimeter and in some examples, the diameters are less than 50 microns. The columnar pores 222 can be considered columnar because their structure can be column-shaped. In some examples, the columnar pores 222 constitute a uniform pattern of pores. In some examples, the columnar pores 222 are aligned to extend from a first end of the plug 206 to a second end of the plug 206.

In some examples, the columnar pores 222 can be placed in the insulative material 224 using any suitable processing technique. For example, the columnar pores 222 can be laser drilled or micro drilled in the insulative material 224. In some examples, the plug 206 can be cast or extruded from the insulative material 224. In this manner, the columnar pores 222 can be formed in the insulative material 224 selected as part of the casting or extruding the plug 206. In some examples, the insulative material 224 is processed in some manner to cause the columnar pores 222 to appear. For example, the insulative material 224 can be heated and cooled in a manner that causes the columnar pores 222 to appear.

For the plug 206 to become conductive, the columnar pores 222 can be filled within conductive material. For example, a conductive metal can be heated and forced into the columnar pores 222 similarly as discussed with reference to the pores 218. In this manner, the columnar pores 222 can act as conductive pathways through the plug 206 that extend from the first end of the plug 206 to the second end.

In some examples, the plug 206 is formed such that an amount of visible conductive material within the columnar pores 222 compared to visible insulative material 220 falls within some threshold. Values that fall below the threshold can be said to be visually imperceptible, while values that exceed the threshold can be said to be more visually perceptible. In this manner, the plug 206 can be formed such that when inserted into the opening 208 it becomes visually imperceptible.

The conductive material and the insulative material 224 can be selected to have colors and textures that can be matched to a color and texture of the exterior surface 212. In some examples, when the size of the columnar pores 222 when filled with the conductive material are imperceptible by the naked eye, just the insulative material 224 can be matched to the exterior surface 212.

Figure 2E:
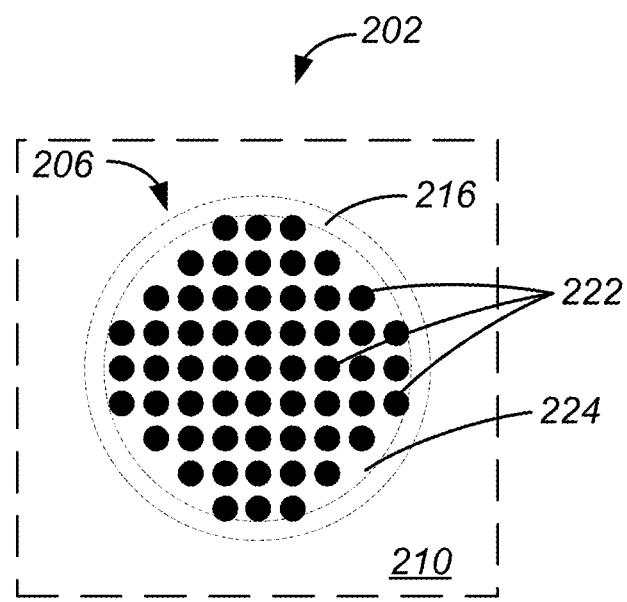
FIG. 2E shows a frontal view of the electrical contact and the housing from FIG. 2A, in accordance with at least one example.

FIG. 2E illustrates a frontal view of the exterior surface 212 of the wall 210 after the plug 206 from FIG. 2D has been installed in the opening 208. In the view illustrated in FIG. 2E, a frontal face of the electrical contact 202 is shown along with the insulator 216. Additionally, in FIG. 2E, the columnar pores 222 are illustrated within the insulative material 224. The columnar pores 222 are shown within the plug 206 having a uniform pattern in all three directions (length, width, and height).

In some examples, after the plug 206 has been placed in the opening 208 of the wall 210, the frontal face of the electrical contact 202 can be processed to create a smooth transition between the electrical contact 202 and the exterior surface 212. Such processing can include machining, sand blasting, or any other suitable process. In some examples, before or after processing, the plug 206 and a portion of the wall 210 surrounding the plug 206 can together form a continuous cosmetic surface. Texture, color, and/or other cosmetic characteristics (e.g., reflectivity, hue, shade, tint, value, iridescence, etc.) can be cosmetically similar within the continuous cosmetic surface; and, thus, cosmetically imperceptible. In some examples, some degree of perceptibility is tolerated other than total imperceptibility.

Figure 3A:
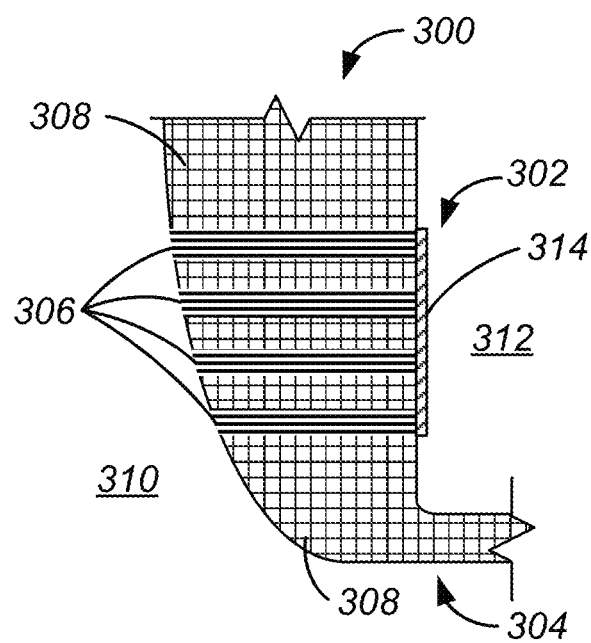
FIG. 3A shows a profile view of an electrical contact in connection with a housing, in accordance with at least one example.

FIG. 3A illustrates a portion of an electronic device 300 that includes an electrical contact 302 according to some embodiments of the disclosure. As shown in FIG. 3A, electrical contact 302 is held within a housing 304 of the electronic device 300. Like the electrical contact 102, the electrical contact 302 can function as an electrical contact when an accessory or other equipment is connected to the electronic device 300.

To this end, the electrical contact 302 can include a plurality of hole clusters 306 that extends through a wall 308 of the housing 304. The plurality of hole clusters 306 can extend from an exterior surface 310 to an interior surface 312 of the housing 304. Each hole cluster 306 can include a plurality of micro holes formed within the respective hole cluster 306. The plurality of micro holes can be formed using micro-forming techniques such as micro-drilling, laser drilling, etc. In some examples, each micro hole has a diameter less than 0.5 millimeter and in some examples, the diameters are less than 50 microns. In some examples, each hole cluster 306 can include hundreds, thousands, or more micro holes. The pluralities of micro holes that make up the plurality of hole clusters 306 can be filled with a conductive material to create a plurality of conductive pathways via the wall 308. For example, the pluralities of micro holes can be backfilled with copper, a conductive precious metal, nickel, tin, conductive polymers, and any other suitable conductive material. In some examples, the pluralities of micro holes are filled by magnetically drawing the conductive material through the micro holes. In some examples, the pluralities of micro holes are filled using a pressure vessel to force the conductive material into the micro holes at high pressure. In some examples, the pluralities of micro holes are filled using a plating process. In some examples, the plurality of conductive pathways, i.e., the plurality of hole clusters 306 with conductive material disposed within the micro holes, can be electrically coupled to a conductive plate 314. The conductive plate 314 can function to electrically couple the plurality of conductive pathways with other items within housing 304. In some examples, each hole cluster 306 functions as its own conductive pathway electrically insulated from the other hole clusters 306. The conductive pathways and the conductive plate 314 can be considered conductive elements. The conductive material can be selected to have color and texture properties that can be matched to the color and texture properties of the exterior surface 310 of the housing 304.

Figure 3B:
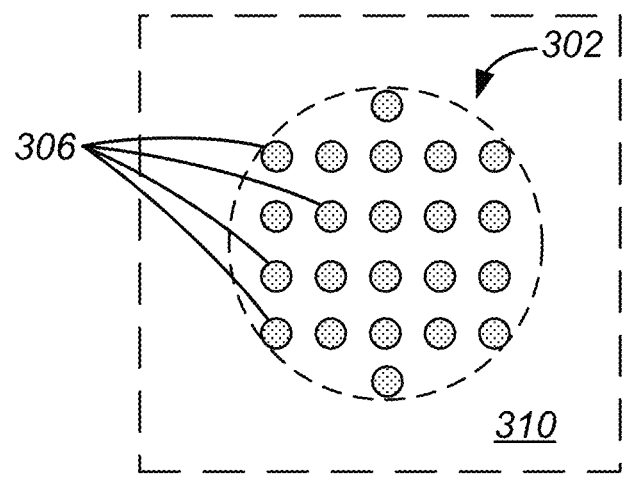
FIG. 3B shows a frontal view of the electrical contact and the housing from FIG. 3A, in accordance with at least one example.

In some examples, the plurality of hole clusters 306 is disposed within the wall 308 of the housing 304 in accordance with some predetermined pattern. For example, as illustrated in the frontal view shown in FIG. 3B, the plurality of hole clusters 306 can correspond to an array of clusters disposed within an exterior boundary of the electrical contact 302. Similarly, the plurality of micro holes can be disposed within each of the plurality of hole clusters 306 in accordance with some predetermined pattern. Both predetermined patterns can be selected to maximize conductivity of the electrical contact 302, while also seeking to minimize the cosmetic perceptibility of the plurality of hole clusters 306 in the exterior surface 310. In some examples, the plurality of hole clusters 306 can be randomly disposed within the wall 308. In this manner, the plurality of hole clusters 306 may not correspond to a predetermined pattern. Similarly, the plurality of micro holes can be randomly disposed within each of the plurality of hole clusters 306. In some examples, an optimal ratio of micro holes per hole cluster 306 can be computed and maintained as the electrical contact 302 is being formed in the housing 304. In some examples, a similar ratio can be computed that considers the number of hole clusters 306 per surface area of the electrical contact 302. In any event, each ratio may depend also on the diameter of the micro holes, the diameter of the hole clusters 306, the color of the conductive material in the micro holes, and the color of the housing 304.

In some examples, the electrical contact 302 is formed such that an amount of visible conductive material within the micro holes compared to visible exterior surface 310 within the extents of the electrical contact 302 falls within some threshold. Values that fall below the threshold can be said to be visually imperceptible, while values that exceed the threshold can be said to be more visually perceptible. In this manner, the electrical contact 302 can be formed to be visually imperceptible.

In some examples, the pluralities of micro holes of the plurality of hole clusters 306 are formed in the housing 304 after the housing 304 has been anodized. In some examples, after the micro holes have been filled with conductive material, the frontal face of the electrical contact 302 can be processed to create a smooth transition between the electrical contact 302 and the exterior surface 310. Such processing can include machining, sand blasting, or any other suitable process. In some examples, before or after processing, the electrical contact 302 and a portion of the wall 308 surrounding the electrical contact 302 can together form a continuous cosmetic surface. Texture, color, and/or other cosmetic characteristics (e.g., reflectivity, hue, shade, tint, value, iridescence, etc.) can be cosmetically similar within the continuous cosmetic surface; and, thus, cosmetically imperceptible. In some examples, some degree of perceptibility is tolerated other than total imperceptibility.

Figure 4A:
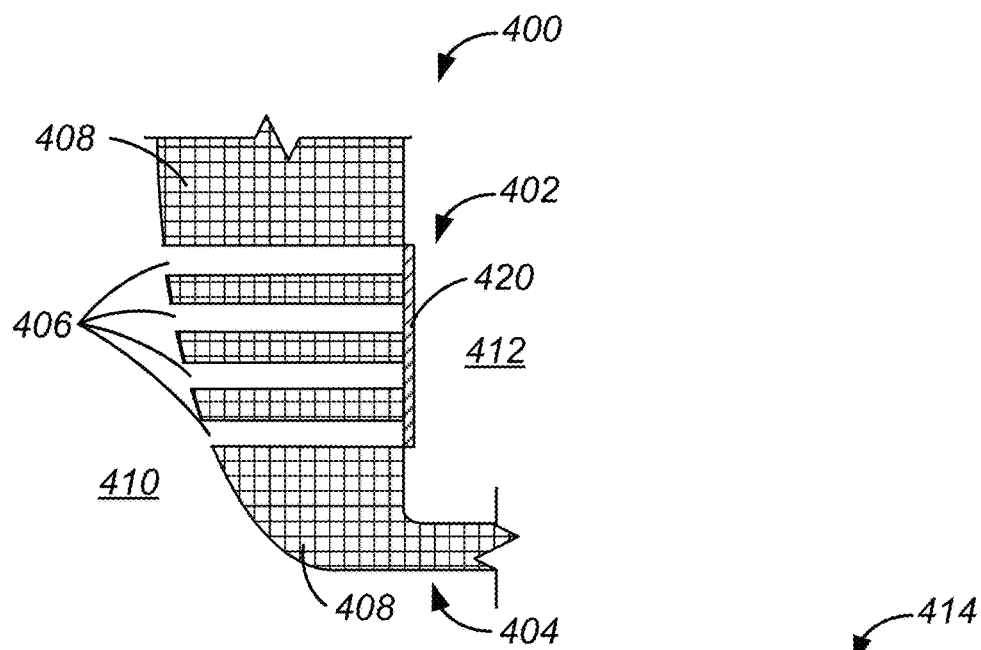
FIG. 4A shows a profile view of an electrical contact in connection with a housing, in accordance with at least one example.

FIG. 4A illustrates a portion of an electronic device 400 that includes an electrical contact 402 according to some embodiments of the disclosure. As shown in FIG. 4A, electrical contact 402 is held within a housing 404 of the electronic device 400. Like the electrical contact 102, the electrical contact 402 can function as an electrical contact when an accessory or other equipment is connected to the electronic device 400.

Figure 4B:
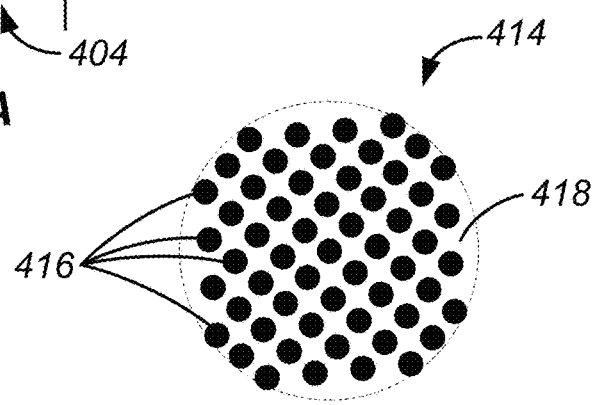
FIG. 4B shows a detailed view of the electrical contact from FIG. 4A, in accordance with at least one example.

To this end, the electrical contact 402 can include a plurality of openings 406 that extends through a wall 408 of the housing 404. The plurality of openings 406 can extend from an exterior surface 410 to an interior surface 412 of the wall 408. Each opening 406 can include a conductive plug 414 formed within the respective opening 406. FIG. 4B illustrates an example conductive plug 414. The conductive plug 414 can include a plurality of conductive fibers 416 disposed within an insulative material 418. For example, the conductive fibers 416 can be arranged into the shape of the conductive plug 414 and the insulative material 418 can be a type of aluminum that is cast around the conductive fibers 416 to form the conductive plug 414. In some examples, the insulative material 418 can be a ceramic material.

In some examples, the plurality of openings 406, when filled with the conductive plugs 414, can create a plurality of conductive pathways. The plurality of conductive pathways can be electrically coupled via a conductive plate 420. In some examples, each conductive plug 414 can function as its own conductive pathway electrically insulated from the other conductive plugs 414. The conductive plugs 414 and the conductive plate 420 can be considered conductive elements.

The conductive material of the conductive fibers 416 and the insulative material 418 can be selected to have color and texture properties that can be matched to the color and texture properties of the exterior surface 410 of the housing 404.

Figure 4C:
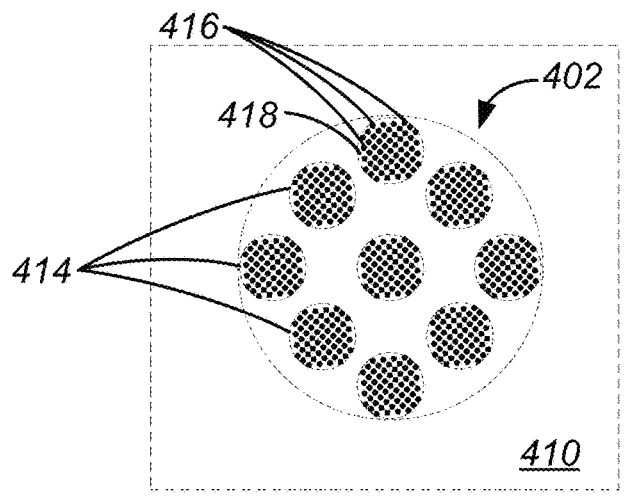
FIG. 4C shows a frontal view of the electrical contact and the housing from FIG. 4A, in accordance with at least one example.

In some examples, the plurality of openings 406 (and the plurality of conductive plugs 414) can be disposed within the wall 408 in accordance with some predetermined pattern. For example, as illustrated in the frontal view shown in FIG. 4C, the plurality of conductive plugs 414 can correspond to an array disposed within an exterior boundary of the electrical contact 402. The predetermined patterns can be selected to maximize conductivity of the electrical contact 402, while also seeking to minimize the cosmetic perceptibility of the conductive plugs 414 in the exterior surface 410. In some examples, an optimal ratio of visible surface area of conductive fibers 416 to visible surface area of insulative material 418 can be computed and maintained as the conductive plug 414 is being formed. In some examples, a similar ratio can be computed that considers the number and surface area of the openings 406 per exterior surface area of the electrical contact 402. In any event, each ratio may depend also on the diameter of the conductive fibers 416, the diameter of the openings 406, the color of the conductive material used in the conductive fibers 416, the color of the insulative material 418, and the color of the housing 404.

In some examples, the electrical contact 402 is formed such that an amount of visible conductive material within the conductive plugs 414 compared to an amount of visible insulative material 418 falls within some threshold. Values that fall below the threshold can be said to be visually imperceptible, while values that exceed the threshold can be said to be more visually perceptible. In this manner, the electrical contact 402 can be formed such to be visually imperceptible.

In some examples, the plurality of openings 406 is formed in the housing 404 after the housing 404 has been anodized. In some examples, the housing 404 can be anodized after the conductive plugs 414 have been inserted into the openings 406. In some examples, after conductive plugs 414 have been placed in the openings 406, the frontal face of the electrical contact 402 can be processed to create a smooth transition between the electrical contact 402 and the exterior surface 410. Such processing can include machining, sand blasting, or any other suitable process. In some examples, before or after processing, the electrical contact 402 and a portion of the wall 408 surrounding the electrical contact 402 can together form a continuous cosmetic surface. Texture, color, and/or other cosmetic characteristics (e.g., reflectivity, hue, shade, tint, value, iridescence, etc.) can be cosmetically similar within the continuous cosmetic surface; and, thus, cosmetically imperceptible. In some examples, some degree of perceptibility is tolerated other than total imperceptibility.

It is understood that any of the electrical contacts described herein can be included in an array or in any other suitable pattern. Any of the electrical contacts can transfer power, ground, control signals, or data. In some examples, multiple arrays of electrical contacts can be included in a single electronic device. Also, since in many embodiments the contacts are mostly or even completely hidden from sight and/or touch, in some embodiments of the disclosure an alignment mechanism can be positioned within the housing of the electronic device proximate to the contact region of the housing. In some examples, the alignment mechanism can include one or more magnets (e.g., an array of magnets) aligned in a manner that attract appropriately aligned magnets in an accessory device having a connector that can be operatively coupled to the contact in the contact region of the electronic device. The alignment mechanism can serve to align the accessory connector with the contact region to ensure proper electrical contact between the hidden contacts in the electronic device and electrical contacts in the accessory connector.

Spatially relative terms, such as "below", "above", "lower", "upper" and the like may be used above to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device, comprising:
   a housing having a wall with an exterior surface, an interior surface, and an opening extending between the exterior surface and the interior surface in a contact region of the housing, the opening having an outer portion disposed at the exterior surface and an inner portion, wherein the exterior surface of the housing in the contact region has a color and a texture; and
   an electrical contact formed in the contact region of the housing, the electrical contact comprising:
      a conductive plug disposed in the inner portion of the opening such that a first end of the conductive plug is recessed from the exterior surface of the housing to partially define the outer portion of the opening; and
      a metallic coating that defines an exterior surface of the electrical contact and fills the outer portion of the opening covering the first end of the conductive plug, wherein a color and a texture of the metallic coating are selected to correspond to the color and the texture of the exterior surface of the housing.

2. The electronic device of claim 1, wherein the electrical contact further comprises an insulative sleeve that forms an insulative barrier between the housing and the electrical contact.

3. The electronic device of claim 1, further comprising an insulative layer disposed within at least a portion of the opening, the insulative layer forming an insulative barrier between the housing and the electrical contact.

4. The electronic device of claim 1, wherein a cross-section of the outer portion of the opening at the exterior surface of the housing is larger than a cross-section of the inner portion of the opening.

5. The electronic device of claim 1, wherein the opening has a circular cross-section, a rectangular cross-section, or a non-uniform cross-section.

6. The electronic device of claim 1, wherein the opening further comprises a transition region disposed between the outer region and the inner region, the transition region comprising a tapered transition from the inner region to the outer region, a curved contoured transition from the inner region to the outer region, or a stepped transition from the inner region to the outer region.

7. The electronic device of claim 1, wherein a diameter of the opening decreases from the outer portion to the inner portion.

8. An electronic device, comprising:
   a housing having a wall with an exterior surface, an interior surface, and a contact region;
   one or more conductive elements disposed within the contact region and extending from the interior surface towards the exterior surface, the one or more conductive elements forming an electrical contact in the contact region; and
   a continuous conductive surface corresponding to the electrical contact, the conductive surface being flush with or recessed less than 50 microns from a portion of the exterior surface surrounding the electrical contact at the exterior surface.

9. The electronic device of claim 8, wherein the one or more conductive elements comprise:
   a conductive plug disposed in an inner portion of an opening of the wall such that a first end of the conductive plug is recessed from the exterior surface of the housing to partially define an outer portion of the opening; and
   a metallic coating that defines an exterior surface of the electrical contact and fills the outer portion of the opening covering the first end of the conductive plug, the continuous conductive surface corresponding to the metallic coating in the outer portion of the opening and the portion of the exterior surface surrounding the metallic coating.

10. The electronic device of claim 8, wherein the one or more conductive elements comprise one or more conductive pathways extending from the exterior surface to the interior surface.

11. The electronic device of claim 10, wherein the conductive plug is substantially wider near the exterior surface than at the interior surface.

12. The electronic device of claim 10, wherein the continuous cosmetic surfaces comprises:
   one or more conductive surfaces of the one or more conductive pathways that are adjacent to the exterior surface; and
   one or more insulative surfaces of the plug that are adjacent to the exterior surface.

13. The electronic device of claim 8, wherein the one or more conductive elements comprise a hole cluster extending from the exterior surface to the interior surface, the hole cluster comprising:
   a plurality of miniature holes extending from the exterior surface to the interior surface; and
   conductive material extending within at least a portion of the plurality of miniature holes.

14. The electronic device of claim 13, wherein the hole cluster is a first hole cluster, and wherein the one or more conductive elements comprise:
   a plurality of hole clusters extending from the exterior surface to the interior surface; and
   a conductive plate disposed adjacent to the interior surface, the conductive plate electrically connecting the first hole cluster and at least one hole cluster of the plurality of hole clusters.

15. The electronic device of claim 8, wherein the one or more conductive elements comprise a conductive plug extending from the exterior surface to the interior surface, the conductive plug comprising a plurality of conductive fibers disposed within an insulative material.

16. The electronic device of claim 15, wherein the conductive plug comprises a first conductive plug, and wherein the one or more conductive elements comprise:

a plurality of conductive plugs extending from the exterior surface to the interior surface; and
a conductive plate disposed adjacent to the interior surface, the conductive plate electrically connecting the first conductive plug and at least one conductive plug of the plurality of conductive plugs.

* * * * *